United States Patent [19]
Radtke et al.

[11] Patent Number: 5,974,369
[45] Date of Patent: Oct. 26, 1999

[54] RECORDING AND PROCESSING METERED INFORMATION

[75] Inventors: Mark A. Radtke; J. Jay Nick, both of Green Bay, Wis.

[73] Assignee: WPS Energy Services Inc., Green Bay, Wis.

[21] Appl. No.: 08/704,325

[22] Filed: Aug. 28, 1996

[51] Int. Cl.[6] .................................................. H04Q 9/00
[52] U.S. Cl. ........................................ 702/199; 702/190
[58] Field of Search ....................... 702/60–62, 189–191, 702/199; 340/870.01–870.06; 324/76.11, 113, 114

[56] References Cited

U.S. PATENT DOCUMENTS

| | | | |
|---|---|---|---|
| 4,218,737 | 8/1980 | Buscher et al. | 364/493 |
| 4,254,472 | 3/1981 | Juengel et al. | 364/900 |
| 4,399,510 | 8/1983 | Hicks | 364/464 |
| 4,442,492 | 4/1984 | Karlsson et al. | 364/464 |
| 4,608,560 | 8/1986 | Allgood | 340/825.52 |
| 4,628,435 | 12/1986 | Tashiro et al. | 364/130 |
| 4,675,828 | 6/1987 | Winston | 364/483 |
| 4,843,575 | 6/1989 | Crane | 364/550 |
| 5,161,110 | 11/1992 | Dorchak | 364/468 |
| 5,216,623 | 6/1993 | Barrett et al. | 364/505 |
| 5,270,704 | 12/1993 | Quintana et al. | 340/870.02 |
| 5,289,362 | 2/1994 | Liebl et al. | 364/140 |
| 5,351,202 | 9/1994 | Kurtzberg et al. | 364/552 |
| 5,369,570 | 11/1994 | Parad | 364/401 |
| 5,424,958 | 6/1995 | Knupp | 364/493 |
| 5,509,108 | 4/1996 | Yeh | 395/114 |
| 5,519,622 | 5/1996 | Chasek | 364/464.04 |
| 5,546,318 | 8/1996 | Lee, Jr. . | |

OTHER PUBLICATIONS

Controll Systems International; Mar. 1994; Product Profile "1/Site Satellite Site Controllers".

Echelon Corporation; Mark Lockareff; May 11, 1995; "Lon-Works Technology" A Controlling Networking Solution for the Utility Industry.

Metnetek + Cellnet Announce Alliance, unattributed, pp. 1–3, news release by cellnet, Metretak, Feb. 25, 1997.

KN Energy to use Research's Whisper Two–Way Radio Link for AMR Trial in Scotts Bluff, Nebraska., unattributed, pp. 1–2, news release by Diablo, Sep. 9, 1996.

*Primary Examiner*—John Barlow
*Assistant Examiner*—Craig Steven Miller
*Attorney, Agent, or Firm*—Thomas D. Wilhelm; Michael L. Winkelman

[57] ABSTRACT

This invention relates to a recording node for receiving energy-related consumption meter data, for calculating consumption amount and consumption rate, and for storing such information. The invention further relates to networks into which the recording node is incorporated, or which can otherwise be accessed by the recording node. The recording node receives signals from a meter and calculates a current consumption rate value and a predicted consumption value for a time interval. At the end of the time interval, values calculated for the interval are stored in memory in the recording node and the recording node resets and begins calculating values for the next time interval. Price data may be received at the recording node from an external source, over a network, such as a distributed network, which includes the recording node. Consumption values and price data stored in the recording node are available to other nodes in the network. The network preferably does not include a central processor.

31 Claims, 14 Drawing Sheets

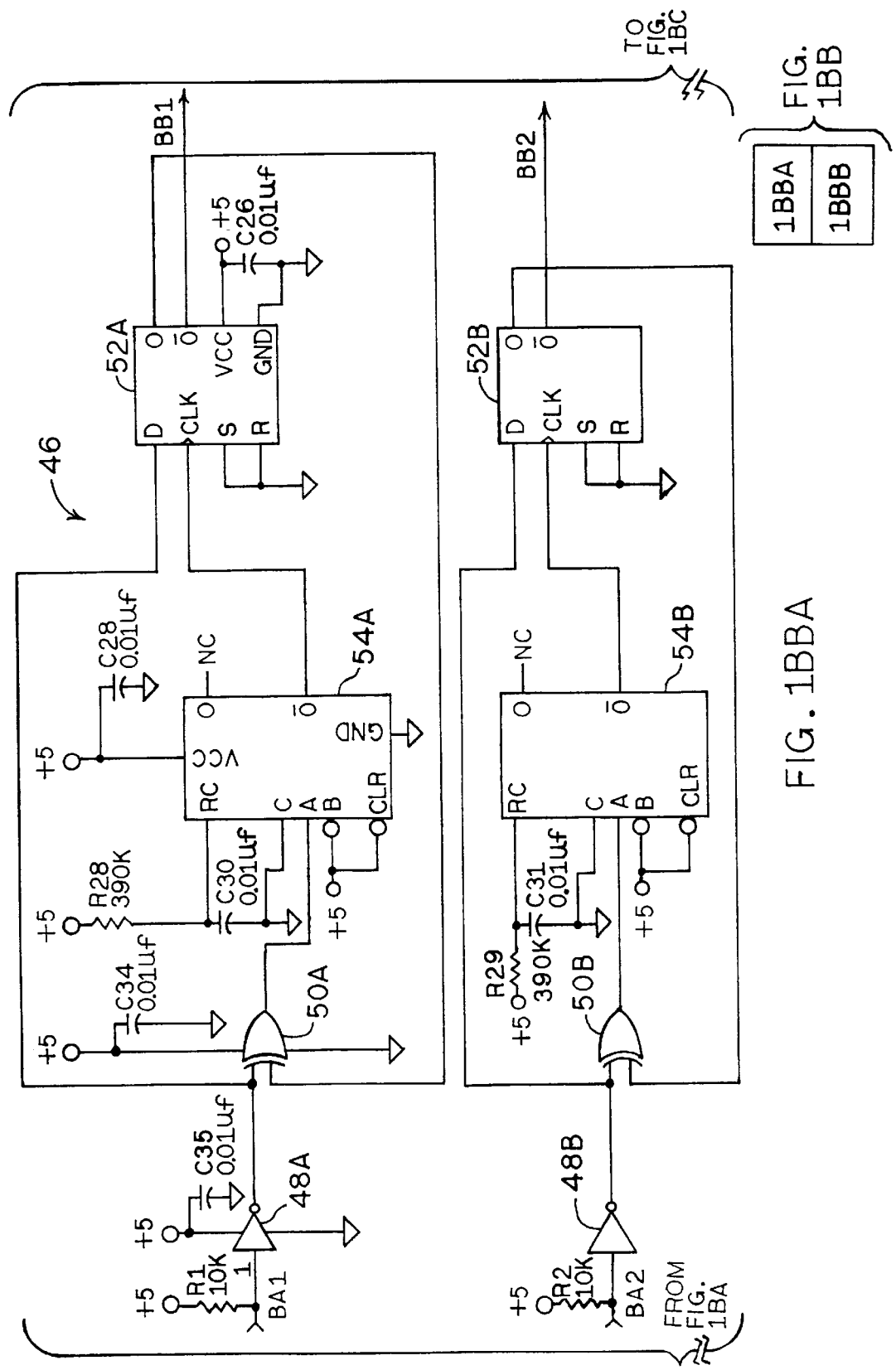
FIG. 1BBA

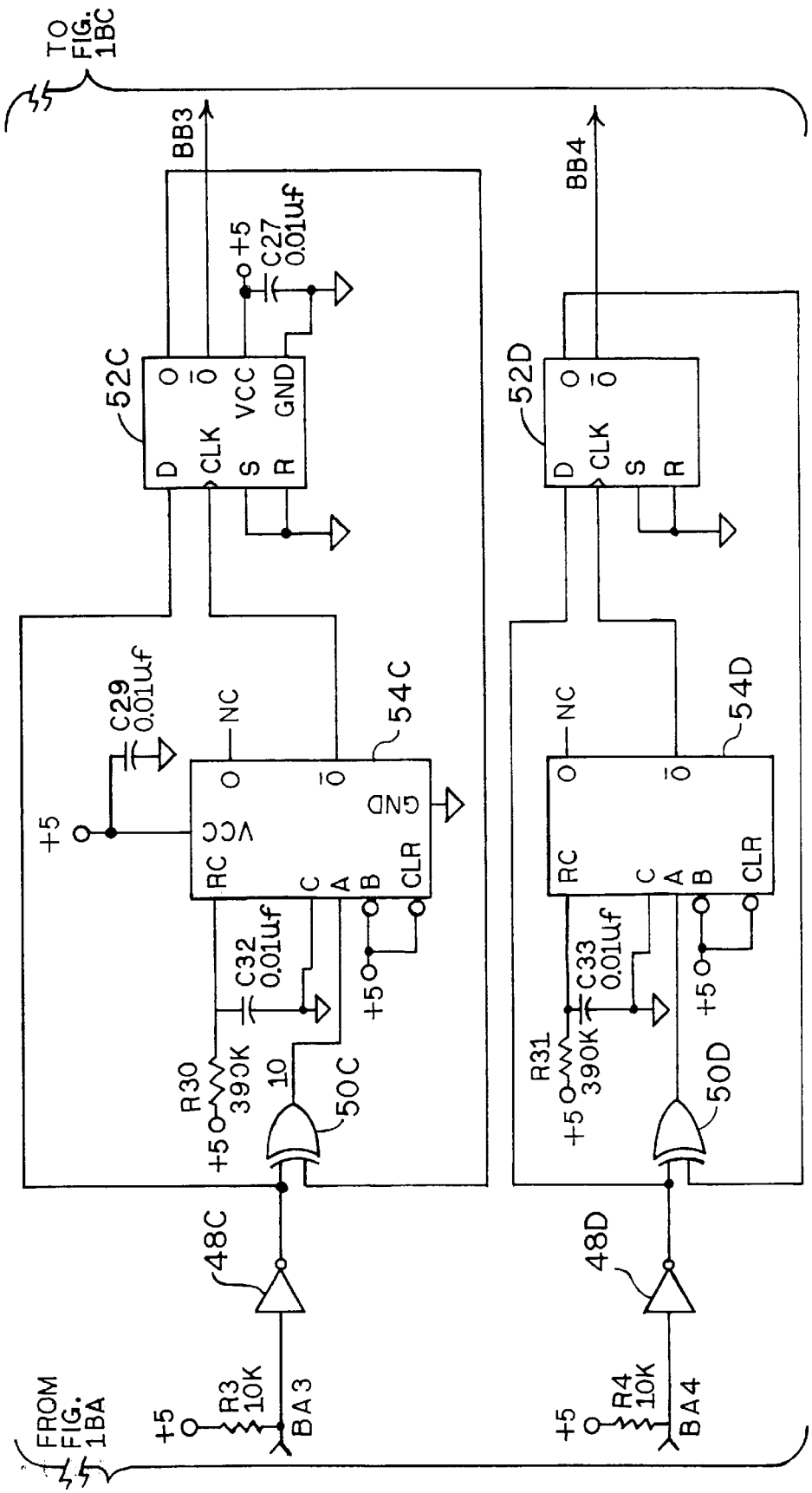
FIG. 1BBB

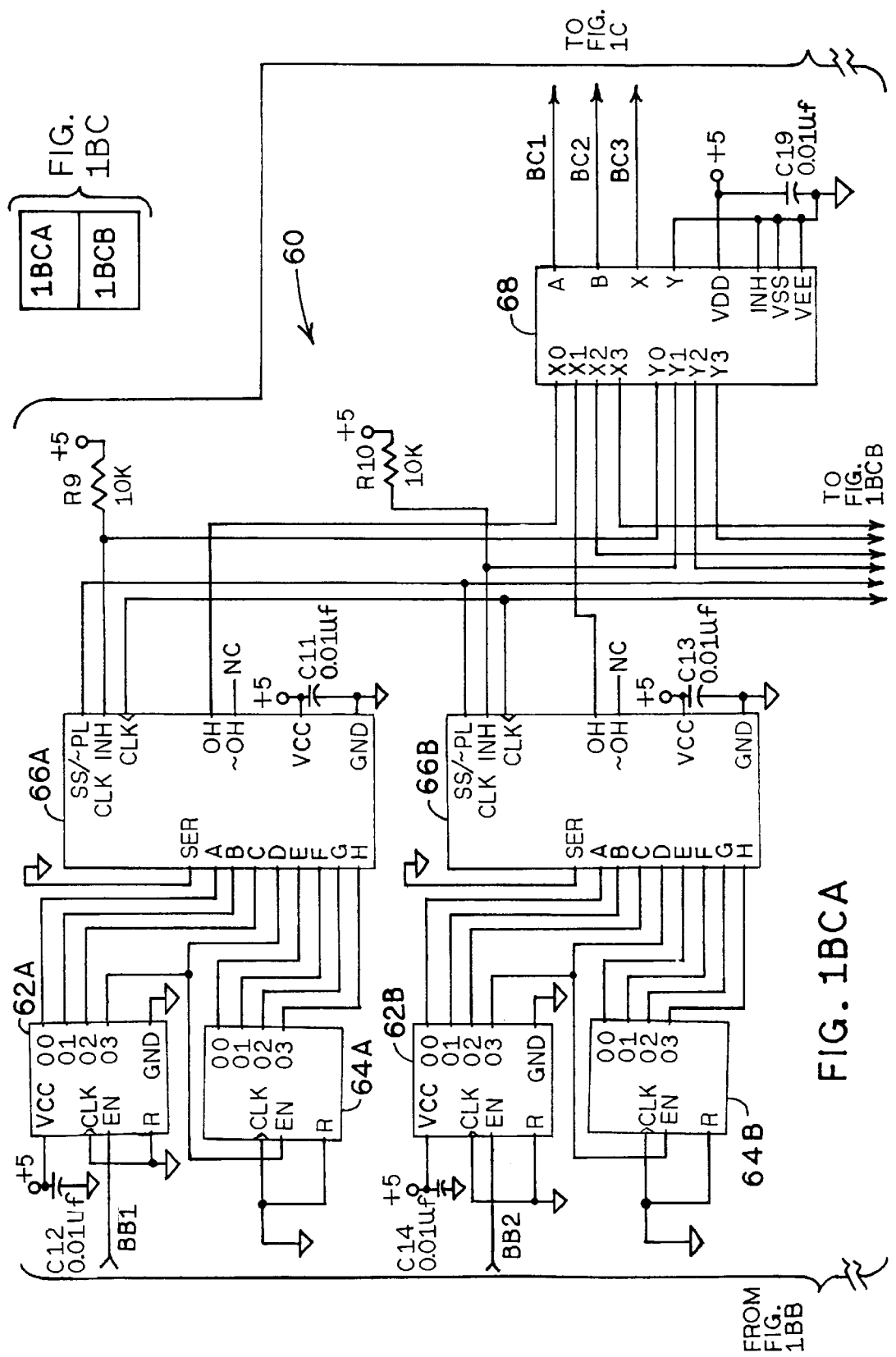

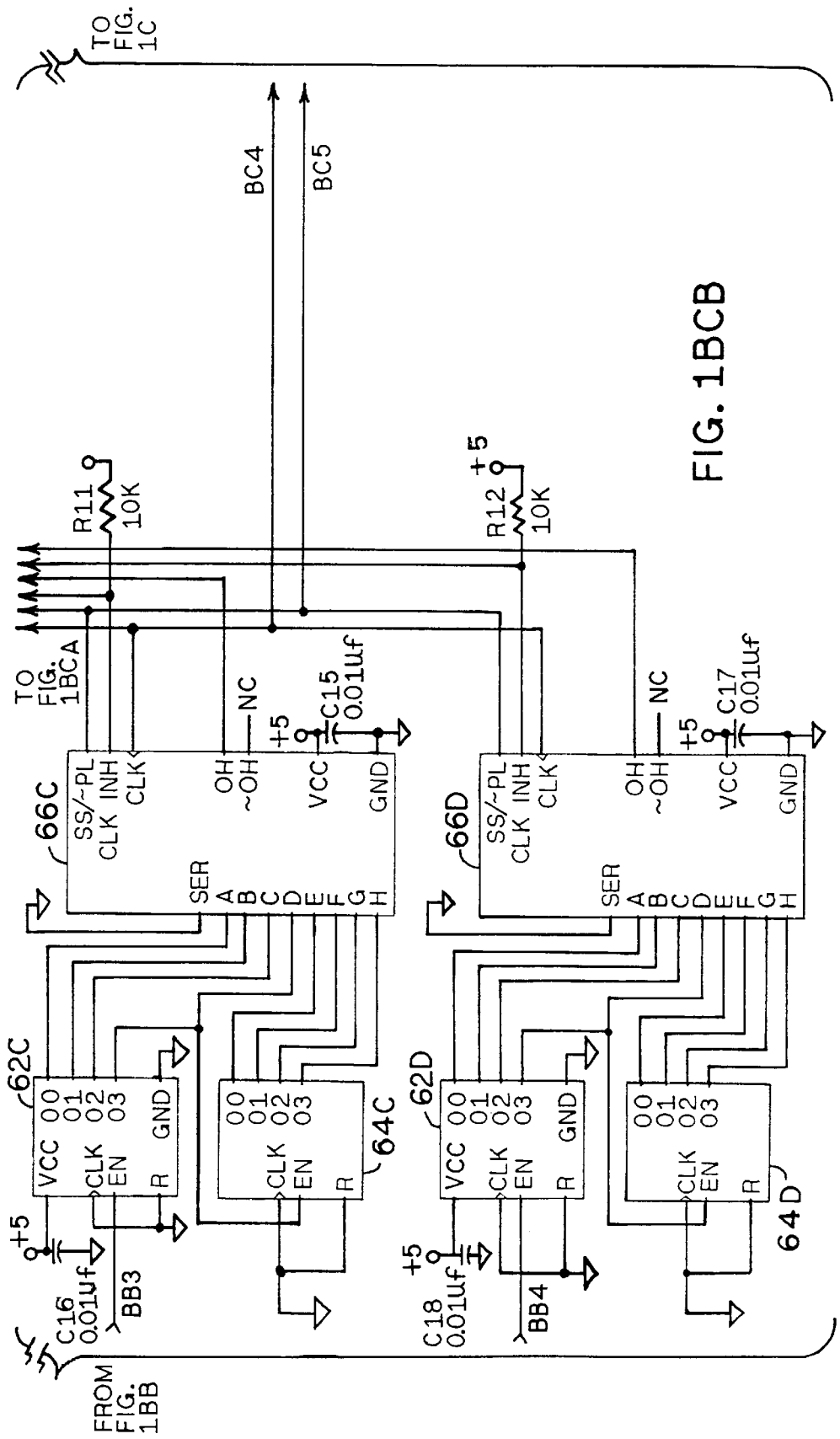

RECORDING AND PROCESSING METERED INFORMATION

FIELD OF THE INVENTION

This invention relates to management systems, such as energy management systems that manage the use of energy, or environmental management systems that control an environment, such as temperature, humidity or the like. More particularly, the invention relates to a recording node useful in storing and/or calculating meter data and to management systems using such recording node. The recording node can send and receive data from other devices in a process control network.

BACKGROUND OF THE INVENTION

This invention relates to a recording node and to management systems using such recording node. The recording node of the invention receives meter outputs, and calculates and stores meter values, and stores data received from external devices. The information stored in the recording node can be made available to other nodes in a process control network and/or to other nodes in a distributed network, or in any type of network, to provide information useful for operations of the other nodes.

U.S. Pat. No. 4,218,737 to Buscher et al discloses a metering system which synchronizes demand periods for a power provider and a customer. The system provides real time energy consumption data to a customer monitoring station.

U.S. Pat. No. 4,254,472 to Juengel et al discloses a remote metering system. A remote metering device monitors, collects, analyzes and displays data from a plurality of meter devices, and transmits the data to a central system receiving device.

U.S. Pat. No. 4,399,510 to Hicks discloses a system for monitoring and displaying utility usage to a local user. The system displays the current cost of the energy used. A system controller projects monthly billing cost based on the current rate of consumption. Pulses are fed from a metering device to a central system controller for calculating the amount of energy being used. The central system controller can control energy consuming devices and can display the consumption-related data. The system projects the expected cost for the billing period, such as a month (Column 4, lines 4–24).

U.S. Pat. No. 4,442,492 to Karlsson et al discloses a system including a central control unit for ongoing reading and registration of customer power consumption at a customer location remote from the central unit. The system displays, at the remote location, the price, consumption and cost of energy currently being used. Price is changed in real time to adjust for real time changes in cost of producing the energy. Such price changes are transmitted to the remote customer location for real time monitoring by the customer.

U.S. Pat. No. 5,289,362 to Liebl et al discloses an energy control system confined to a single premise, having a controller which uses time sensitive price tier data, entered and stored in the controller, on the premises, to control an appliance or HVAC system. The controller can control appliances based on the price in effect at any given time.

U.S. Pat. No. 5,509,108 to Yeh discloses a computer network in a building, sensing pre-set conditions in the building, and controlling utilities and/or intelligent apparatus in the building in response to the conditions sensed.

SUMMARY OF THE INVENTION

This invention generally comprehends a recording node for receiving energy-related consumption data from metering devices, for calculating consumption and consumption rates, for storing such information, and for making such information available over a network. The recording node generally comprises a receiving device, a storage device, and a calculating device. The recording node receives signals from one or more meters, and can calculate accumulated consumption amount for a particular time interval, predicted consumption amount for the time interval, and pseudo real-time consumption rate. At the end of the time interval, values calculated for the interval are stored in non-volatile memory in the recording node, and the recording node resets and begins calculating values for the next time interval. Price data may be received at the recording node from an external source, e.g. over a network, such as a distributed network, which network may include the recording node.

The recording node may include a receiving device receiving the metering data, and a separate distributing terminal making the stored metering data available to the network. The recording node can also receive data and other information from other nodes on the network, such as weather and/or pricing information.

The invention further comprehends a distributed network, operating according to a network protocol. The distributed network comprises a plurality of network nodes, but no central network computer node or other central processor for controlling operation of the distributed network. At least one of the network nodes comprises the recording node receiving metering consumption data from a product meter, storing the consumption data, and making the consumption and other data available to others of the network nodes.

The recording node preferably includes a power supply circuit, a meter signal processing circuit, an interface unit, and a computer unit.

Yet further, the invention comprehends a method of generating a pseudo real-time consumption rate value for a management system. The method comprises the steps of periodically receiving metering data from one or more meters, accumulating sets of values received from the meter or meters for a predetermined period of time, summing the values so accumulated for a number of the time periods, and averaging the accumulated values.

The invention also comprehends a method of managing consumption rate values for an energy management system. The method comprises the steps, at a premise of an energy user, of reading metering data from one or more meters, calculating a current pseudo real-time consumption rate value for the metered data, and calculating a predicted consumption value for the entirety of a time interval which may be shorter than a billing period.

BRIEF DESCRIPTION OF THE DRAWINGS

FIG. 1BB shows a debouncing circuit for the meter signal processing circuit of the recording node of FIG. 1.

FIG. 1BC shows a counting circuit for the meter signal processing circuit of the recording node of FIG. 1.

Figure 1:
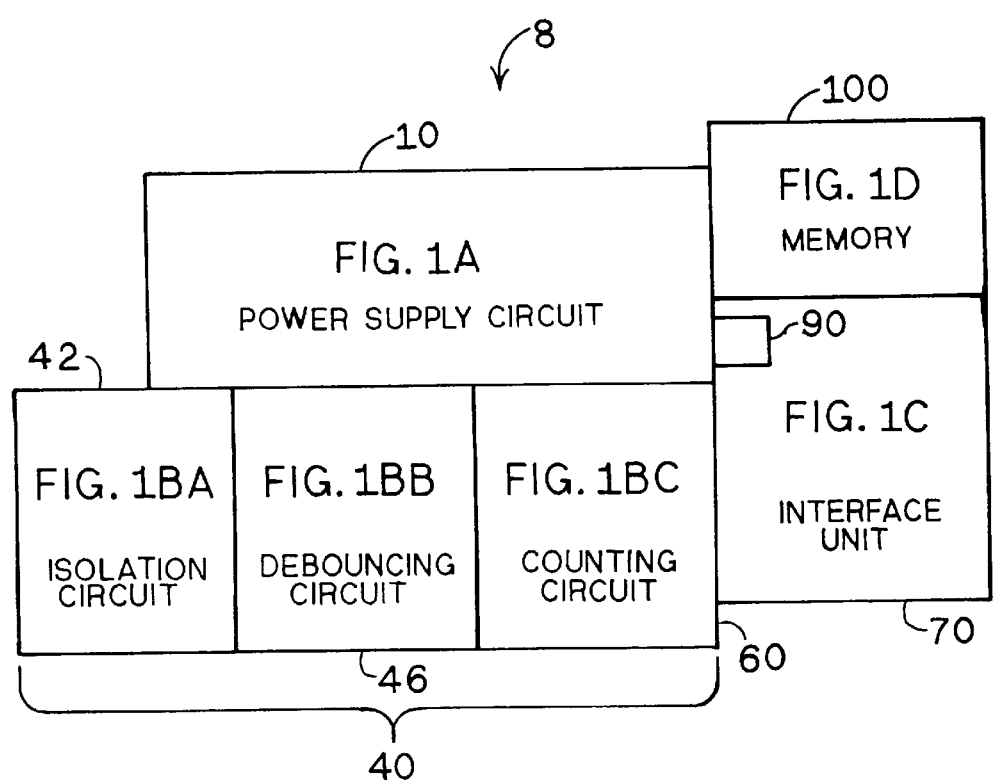
FIG. 1 is a block diagram of a recording node of the invention, including reference to FIGS. 1A, 1BA, 1BB, 1BC, 1C, and 1D.

The invention is not limited in its application to the details of construction and the arrangement of the components set forth in the following description or illustrated in the drawings. The invention is capable of other embodiments or of being practiced or carried out in various ways. Also, it is to be understood that the terminology and phraseology employed herein is for purpose of description and illustration and should not be regarded as limiting. Like reference numerals are used to indicate like components.

DETAILED DESCRIPTION OF THE ILLUSTRATED EMBODIMENTS

The invention relates principally to a recording node, and to its use in a process control network environment and/or in a distributed network having no central processor. FIG. 1 is a block diagram of a recording node of the invention, indicating elements shown as FIGS. 1A, 1BA, 1BB, 1BC, 1C and 1D, which elements represent respective portions of recording node 8.

Power Supply and Battery Charging Circuit

Figure 1A:
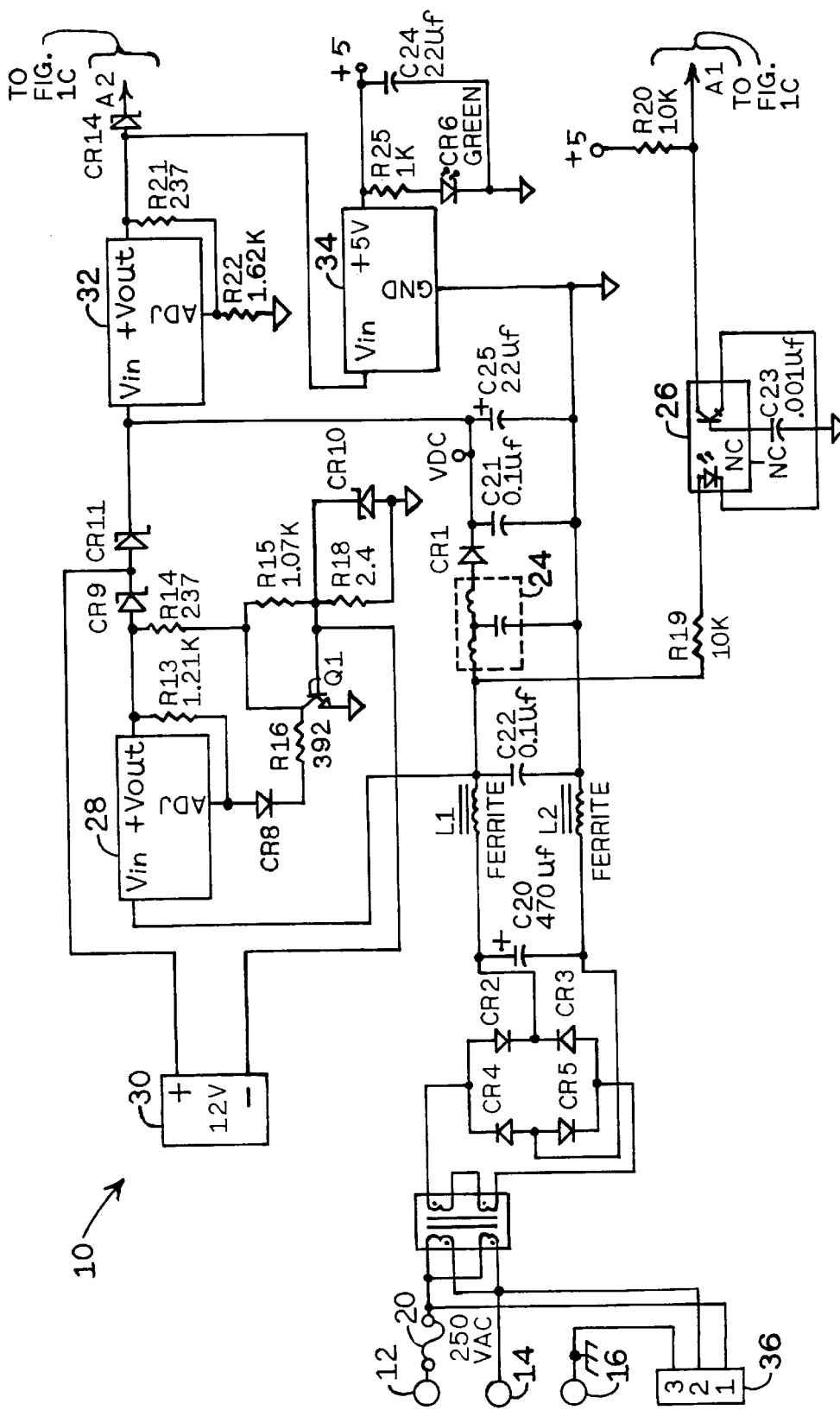
FIG. 1A shows a power supply circuit of the recording node of FIG. 1.

FIG. 1A shows a power supply circuit 10 of recording node 8. Power supply circuit 10 includes power input line terminal 12, neutral terminal 14 and ground terminal 16 configured for attachment to a standard (e.g. 120 volt) alternating current power system. From terminals 12, 14, 16, the alternating current travels to transformer 18 via fuse 20. From transformer 18, the alternating current passes through a full wave bridge rectifier 22 formed by four diodes CR2–CR5. The rectified current then passes through a filtering circuit including capacitors C20, C21, C22, C25, diode CR1, inductors L1, L2 and T filter 24. The rectified current also travels to an optical isolator 26 via a path including resistor R19. Optical isolator 26, includes a light emitting diode, a light sensitive transistor and capacitor C23. Note that the downward arrow below capacitor C23, here and throughout the FIGURES describing recording node 8, comprises an electrical ground symbol. Output signal line A1 carries a signal representing loss of power to a computer unit via an interface unit, both of which will be described hereinafter.

The battery charging portion of power supply circuit 10 includes a voltage regulator 28, zener diodes CR9, CR10, CR11, assorted resistors and transistor Q1 on the ground side of the charging circuit. Battery 30 comprises a back-up power supply for circuit 10. Battery 30 is charged via voltage regulator 28 and the other elements of the battery charging portion of the circuit. In the event of a loss of AC power, battery 30, which preferably comprises a 12 Volt DC lead/acid battery, supplies power to the entire recording node.

Voltage regulator 32, in combination with resistors R21, R22 and zener diode CR14, sends a 9 Volt DC power signal to the interface unit and any other locations in recording node 8 requiring that particular voltage.

Voltage regulator 34, in combination with resistor R25 and capacitor C24, sends a 5 Volt DC power signal to any locations of the recording node requiring that particular voltage. Light emitting diode CR6 emits a display signal indicating that power is available and recording node 8 is operating.

Optional connector 36 comprises a connection for communication of data over the ordinary utility alternating current power line, or may comprise connections over other conventional network media.

Meter Signal Processing Circuit

Figure 1B:
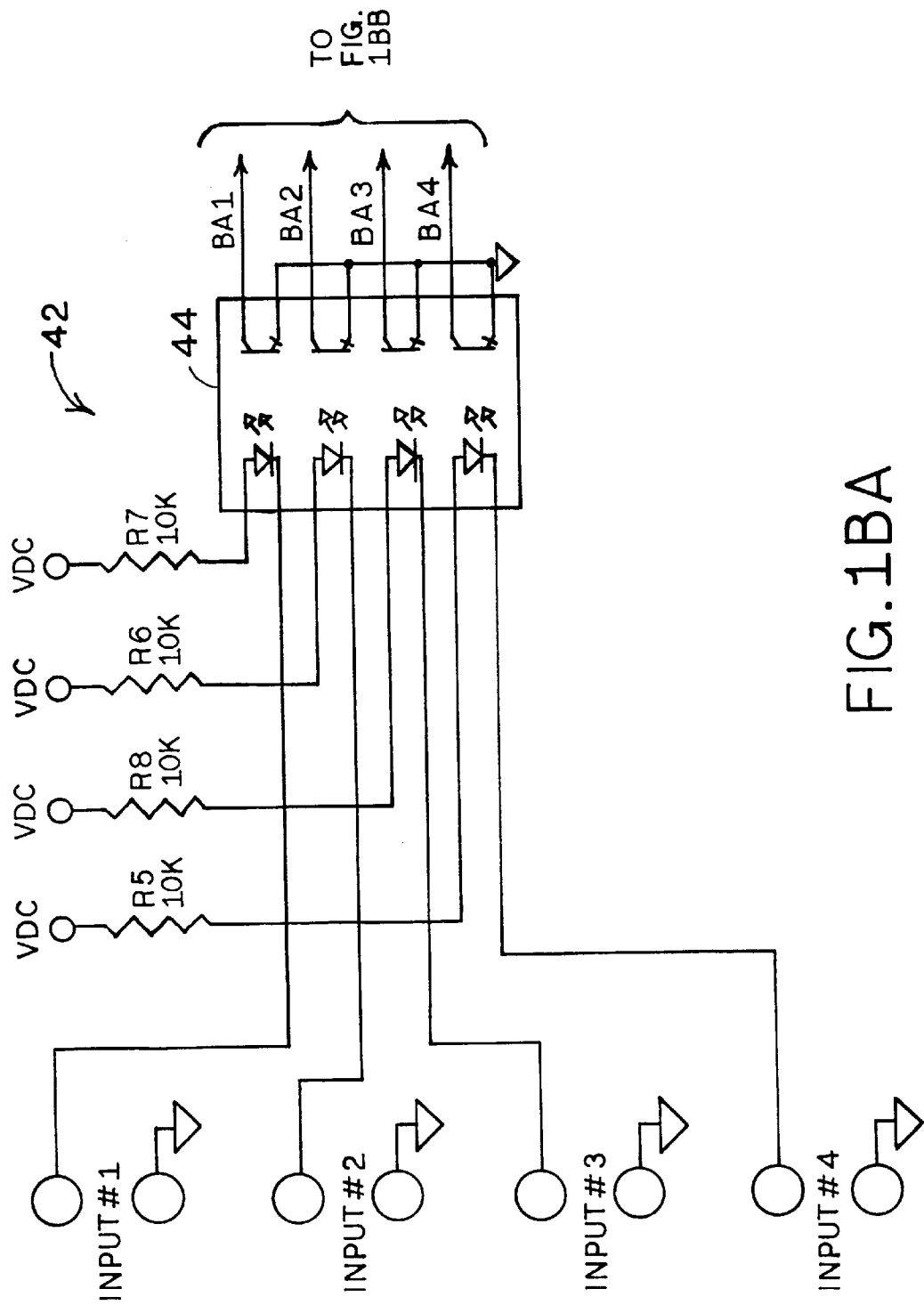
FIG. 1BA shows an isolation circuit for the meter signal processing circuit of the recording node of FIG. 1.

FIGS. 1BA, 1BB and 1BC, in combination, show an entire meter signal processing circuit 40 for processing consumption data signals such as pulses, from one or more meters. As shown in the electrical isolation portion 42 of FIG. 1BA, meter processing circuit 40 can receive input signals, preferably pulses, from up to four meters along four input channels #1–#4, and transfers the signals through optical isolator 44. Optical isolator 44 contains light emitting diodes and light receiving transistors which electrically isolate output signals leaving optical isolator 44 from the input signals entering the optical isolator. While four input terminals #1–#4 are shown in FIG. 1BA, any number of input channels can be provided, along with a corresponding number of optical isolators which process the input signals received on the respective input channels, from a corresponding number of meters. Where the meters provide end of interval signals, generally two channels are used for each meter. The output pulse signals are transferred from optical isolator 44 on output lines BA1, BA2, BA3 and BA4, to the debouncing circuit portion 46 of meter processing circuit 40, shown in FIG. 1BB.

Debouncing circuit portion 46 includes Schmitt Triggers 48A–48D. Meter input pulses, from a respective one of the four meters, pass through amplifier 48A and travel on two paths to an Exclusive-OR gate 50A and to the D input of a D-type flip-flop 52A, respectively. From Exclusive-OR gate 50A, the input pulse travels to a monostable multivibrator 54A. The output of multivibrator 54A travels to the clock input of D-type flip-flop 52A.

The purpose of the debouncing circuit portion 46 is to detect a rising edge of a pulse passing through operational amplifier 48A and not allowing noise or bouncing of the signal to accidentally detect a second rising edge from the same pulse. Thus, a pulse feedback from D-type flip-flop 52A, in combination with Exclusive-OR gate 50A and monostable multivibrator 54A prevents improper detection of rising edges for the input pulse signals.

The other channels shown, comprising operational amplifiers 48B–48D, Exclusive-OR gates 50B–50D, D-type flip-flops 52B–52D and monostable multivibrators 54B–54D operate in the same manner as the first debouncing circuit portion described above, processing outputs from the remaining three meters.

Furthermore, operational amplifiers 48B–48D have the same power and ground connections (not shown) as operational amplifier 48A. Exclusive-OR gates 50B–50D have the same type of power and ground connections (not shown) as Exclusive-OR gate 50A.

Debounced output pulse signals on output lines BB1, BB2, BB3 and BB4 travel to counting circuit portion 60 of meter processing circuit 40 shown in FIG. 1BC. Line BB1 of counting circuit portion 60 includes first and second counters 62A, 64A connected in a cascaded arrangement. Pulse signals on line BB1 are inputted to first counter 62A. First counter 62A counts the number of input signals. When first counter 62A reaches a maximum value, an output thereof is sent to second counter 64A. The number of pulses counted by first and second counters 62A, 64A is inputted into Parallel in/Serial out shift register 66A. The output of shift register 66A can be considered accumulated signals for the first channel.

Counters 62B–62D, 64B–64D, and shift registers 66B–66D operate in a similar manner to process pulse signals received on lines BB2, BB3, BB4. Each input channel, including a pair of counters and a shift register, sums or counts the number of pulses or other input signals received from a respective metering device connected to that channel. Each input channel comprises one of the paths from a respective input terminal #1, #2, #3, or #4 (FIG. 1BA) through meter signal processing circuit 40, to interface unit 70 in FIG. 1D. Thus, as illustrated, the meter signal processing circuit 40 has 4 input channels supplying data to interface unit 70.

Figure 1C:
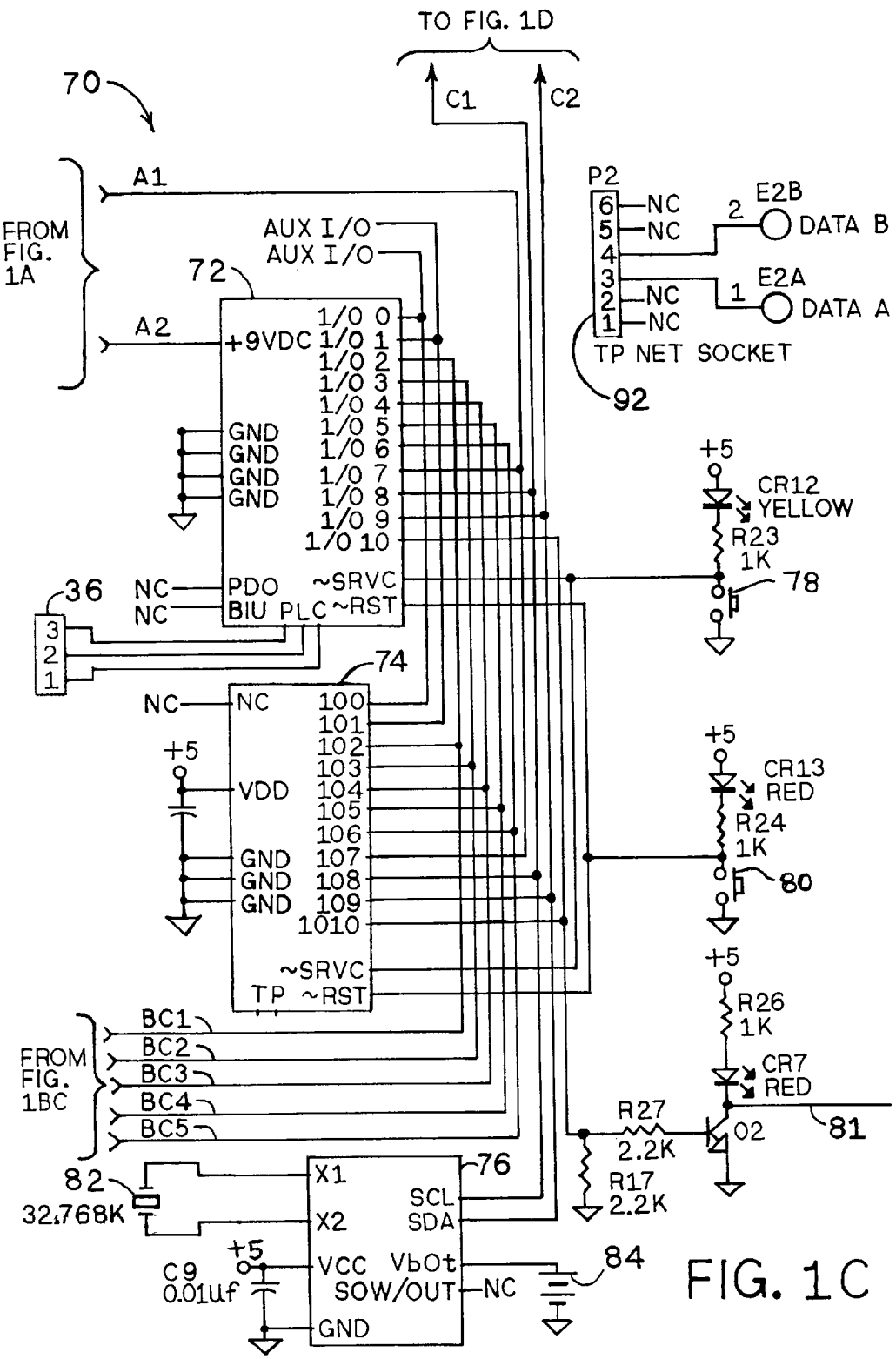
FIG. 1C shows a circuit for at interface unit and a clock/calendar device of the recording node of FIG. 1.

Multiplexor/Demultiplexor 68 selectively reads values from each of the four Parallel in/Serial out shift registers 66A–66D. Multiplexor/Demultiplexor 68 then sends signals from a selected channel via output data line BC3 to interface unit 70 shown in FIG. 1C. Any of the four channels can communicate with interface unit 70 via select lines BC1 and BC2. The channels preferably are sequentially transmitted to interface unit 70. Lines BC4 and BC5 control the timing and sequencing at which information is transmitted serially to interface unit 70.

While only four channels and four parallel in/serial out shift registers 66A–66D are shown, recording node 8 can be modified to have eight channels and eight shift registers or any other desired number of channels to support the number of meters required for a particular application.

Interface Unit

Interface unit 70 includes at least one of at least two possible sockets. First socket 72 can be used for a power line communication embodiment. Second socket 74 can be used for a twisted pair communication embodiment. Input/output lines are connected to Multiplexor/Demultiplexor 68, clock/calendar device 76, power supply loss indication line Al, power supply line A2, the memory device of FIG. 1D, service push button 78, reset push button 80, and auxiliary output indicator line 81. Auxiliary data lines I/O 0 and I/O 1 are unused in the illustrated embodiment, and therefore are available for additional applications.

Clock/calendar device 76 includes a crystal 82 and a back-up power supply 84. Crystal 82 resonates to calculate the current time which is sent to first socket 72 and second socket 74.

Back-up power supply 84 comprises a 3 Volt lithium battery sufficient to power clock/calendar device 76 in response to a power failure longer than a power failure supported by primary battery 30.

While two sockets 72, 74 are shown, a single socket may be utilized depending on the type of network chosen. Details of an exemplary network system and its operation are disclosed hereinafter.

Element 90 shown in FIG. 1 comprises a computer unit. Computer unit 90 preferably comprises a microprocessor having flash memory and firmware. Computer unit 90 connects with interface unit 70 at one of sockets 72, 74.

Computer unit 90 most preferably comprises a controller chip, such as that available from Echelon Corporation, Palo Alto, Calif., and sold under the name NEURON CHIP™. Such chip comprises a computer processor with the ability to provide a number of calculations which will be described hereinafter.

Other chips that can provide similar functions may be usable depending on the functions required for operation of the particular network to which recording node 8 is connected. Other data processing units having sufficient processing power to operate recording node 8 can be used for computer unit 90.

Service push button 78 includes a light emitting diode CR12 which emits light, indicating closure of the service command circuit, which causes transmission.

Reset push button 80 includes light emitting diode CR13 which illuminates to indicate that the entire system is being rebooted. Thus, pushing reset button 80 resets computer unit 90.

Auxiliary output line 81 can send output data to a wide variety of elements at the choice of the user.

First socket 72 connects power line connector 36, shown in FIG. 1A, to computer unit 90. When using first socket 72 as part of computer unit 90, second socket 74 is not necessary to the invention.

Likewise when second socket 74 is connected to twisted pairs e.g. as part of computer unit 90, first socket 72 is no longer necessary to operability of the invention.

In this arrangement, data is transmitted between computer unit 90 and memory device circuit 100 on lines I/O 8 and I/O 9 from either socket device 72, 74.

Memory Device Circuit

Figure 1D:
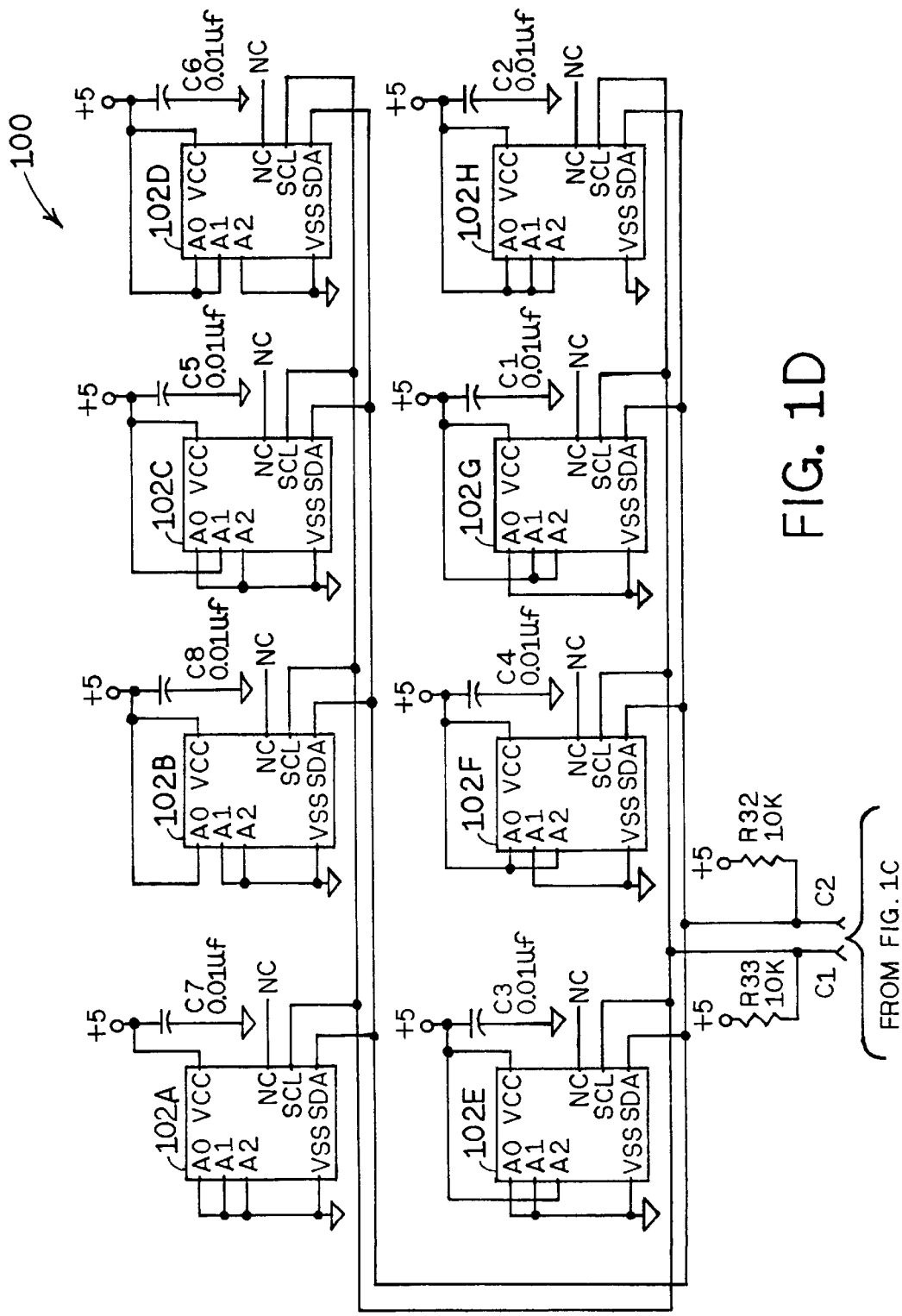
FIG. 1D shows a circuit for a memory device of the recording node of FIG. 1.

Data from input/output lines (I/O 8 and I/O 9) C1, C2 of interface unit 70 connect to memory device circuit 100 as shown in FIG. 1D.

Memory device circuit 100 includes a plurality of CMOS serial non-volatile memory devices 102A–102H. Memory devices 102A–102H store values sent from computer unit 90 via interface unit 70. Memory devices 102A–102H preferably comprise smart serial non-volatile EEPROM memory chips manufactured by Microchip Technology of Chandler, Ariz. EEPROM represents Electrically Erasable Programmable Read Only Memory device. The memory devices, despite the name, do allow data to be written and stored from computer unit 90 as well as erased electronically upon command.

Recording Node Alternatives

The above described power supply circuit 10, meter signal processing circuit 40, interface unit 70, computer unit 90, and memory device circuit 100 are just one representation of the recording node 8. Other elements having equivalent functions can be substituted for the elements of the above listed circuits and units. Furthermore, structurally different elements, such as analog circuit devices can perform functions disclosed as being performed by digital elements in the above disclosed circuits and units. Finally, other circuits having equivalent functions can be substituted for the above listed circuits.

Operation of the Recording Node

Figure 2:
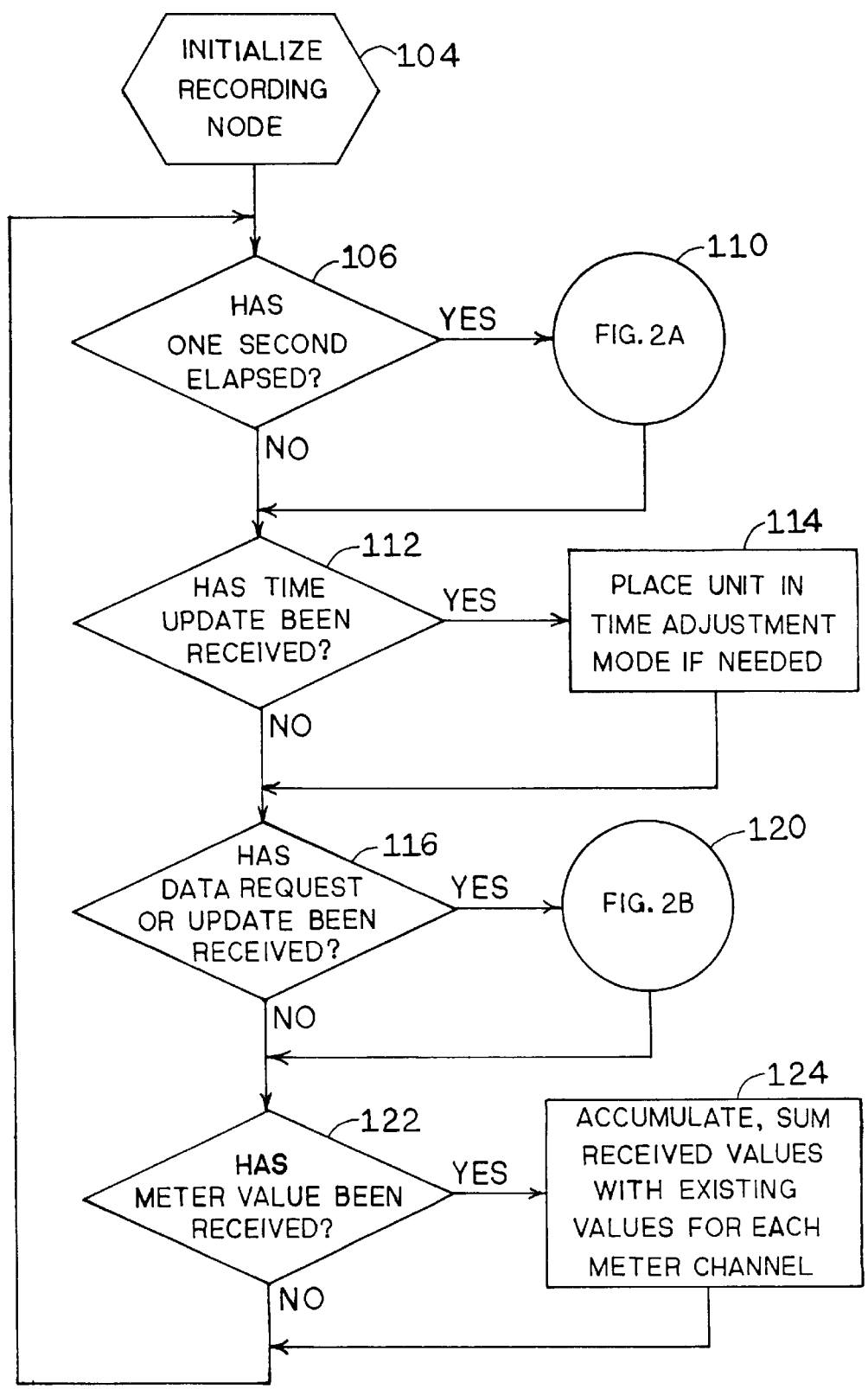
FIG. 2 shows a general flow chart of the operation of the recording node of FIG. 1.

Operation of recording node 8 shown in FIGS. 1–1D, and especially computer unit 90 therein, can best be described by reference to the flow charts of FIGS. 2, 2A, 2B and 2C. Step 104 of FIG. 2 shows initialization of the recording node 8, receiving the time from clock/calendar device 76, logging a start-up event in memory device circuit 100, and initializing internal tables in computer unit 90.

Step 106 comprises a decision tree asking whether or not one second has elapsed. If YES, path 110 (FIG. 2A) is selected. Path 110 will be described later. If NO, step 112 is selected.

Figure 3:
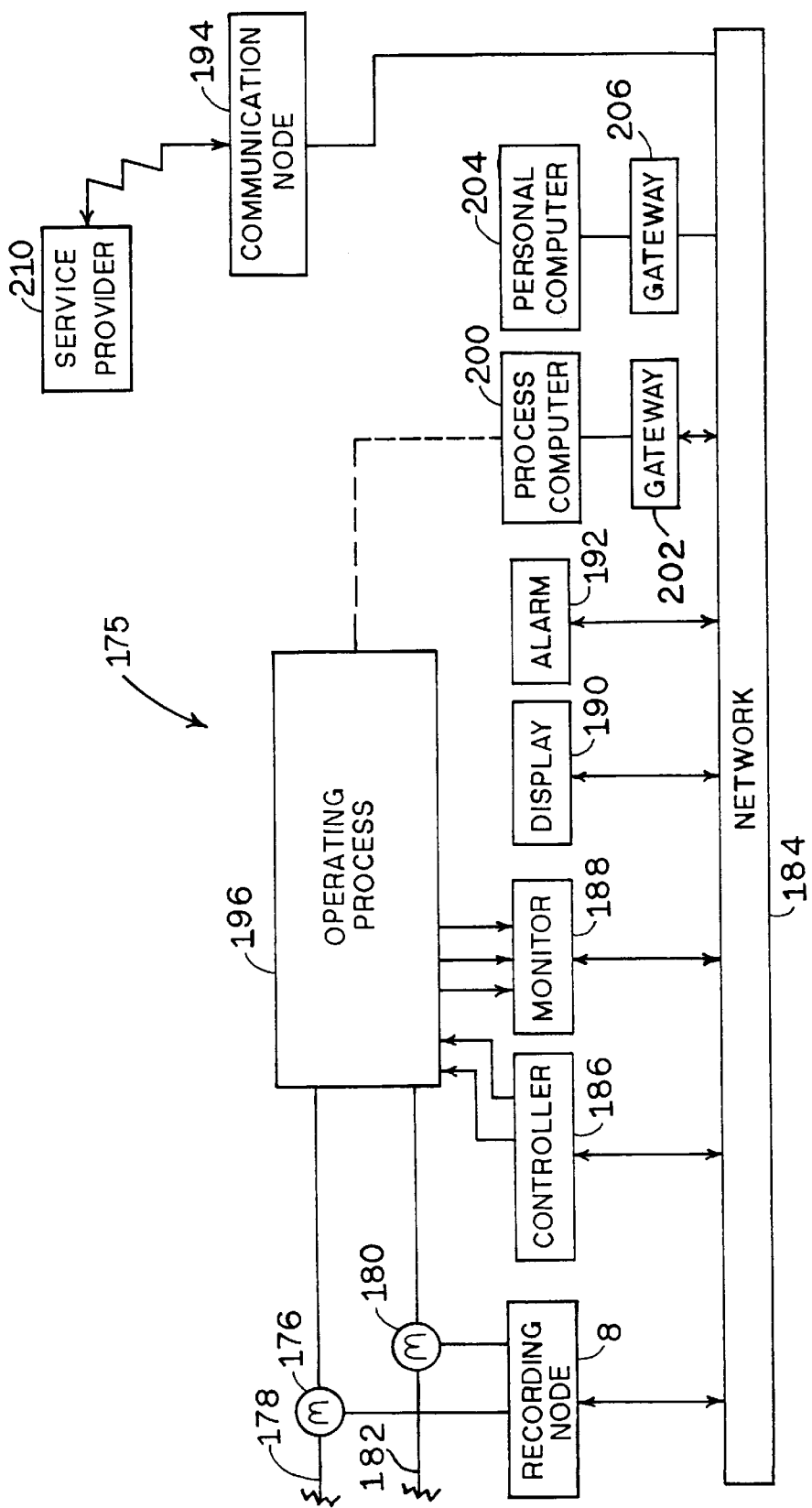
FIG. 3 is a block diagram illustrating an embodiment of a process control network utilizing the recording node of FIG. 1.

Step 112 comprises a decision tree asking whether or not a time update has been received by computer unit 90 e.g. over a network 184 (See FIG. 3). If YES, the process proceeds to step 114. If NO, step 116 is selected.

At step 114, the time is adjusted to nullify any difference between the time value of clock/calendar device 76 and a time value received over network 184. Namely, computer unit 90 and clock/calendar device 76 are placed in a time adjustment mode, indicated as step 114, where time (such as seconds) of the clock/calendar device is advanced or retarded gradually over time such that, after a number of short adjustment intervals, the time of the clock/calendar device 76 substantially equals the time received from the network.

For example, if the clock/calendar device is 2 seconds ahead of the time value received from the external device, clock/calendar device 76 and computer unit 90 can operate in the adjustment mode for ten intervals of 1.2 seconds per interval, rather than 1 second, so the time values are synchronized. In this manner, recording node 8 continues to operate and generate values during the time adjustment mode, rather than shutting the system off entirely until the times are equalized.

The results of step 114 proceed to join the NO response from step 112 at step 116. Thus step 116 follows step 112 either by bypassing step 114 or after doing the functions of step 114.

Step 116 comprises a decision tree asking whether a data request or a data update has been received via network 184. If YES, the system advances to path 120. If NO, or if path 120 has been completed, the system advances to step 122.

Step 122 comprises a decision tree asking whether a meter value has been received via network 184. If NO, step 122 returns to step 106 and starts the sequence over again. If YES, step 122 is followed by step 124.

Step 124 accumulates a received value from network 184 with existing values for the respective meter or meter channel the received value is associated with. Step 124 then returns to step 106 and repeats the previous sequence.

Figure 2A:
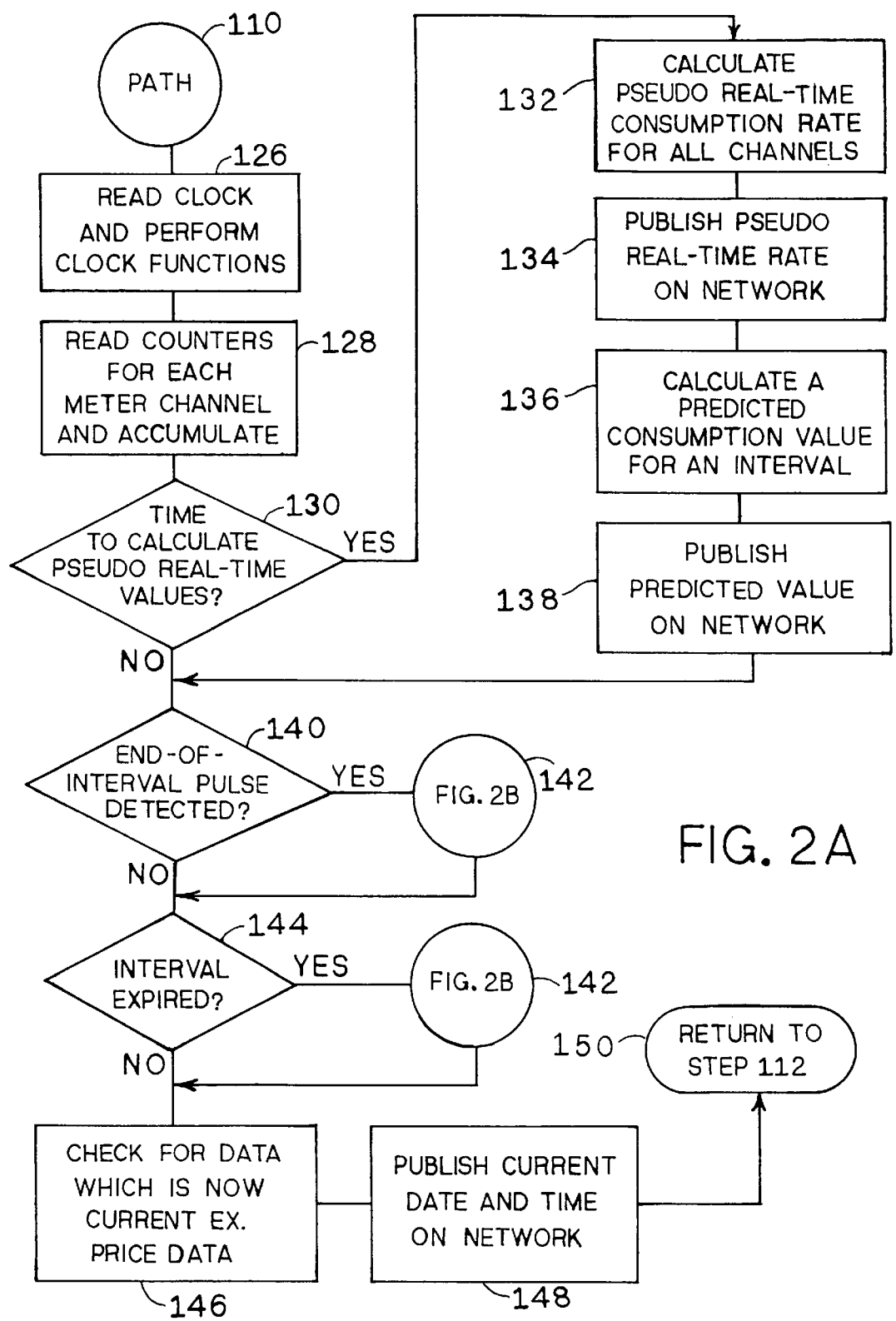
FIG. 2A shows a flow chart of path 110 of FIG. 2.

When a second has elapsed at step 106, path 110 shown in FIG. 2A is then followed. Referring to FIG. 2A, at step 126, the clock/calendar device 76 is read. The clock/calendar device processes any changes caused by leap year, day-light savings time, or any other clock adjustment inputs, as appropriate. Then the system advances to step 128.

At step 128, pulse counters 62, 64 are read in sequence for each meter channel. The pulses are accumulated with existing pulse values for the respective meters in computer unit 90 or in one or more of memory devices 102A–102H. The system then advances to step 130.

Step 130 comprises a decision tree asking whether it is time to calculate pseudo real-time values for the metered signals. After a predetermined time period, such as about 5 to about 30 seconds, most preferably about 10 seconds, the system advances along the YES path to step 132.

At step 132, computer unit 90 calculates pseudo real-time consumption rates for all meter consumption value channels (regardless of whether the data comes from multiplexor/demultiplexor 68 or an external unit over network 184).

A pseudo real-time consumption rate for each channel is calculated by totaling a stack of sets of sample consumption values. The sets of sample consumption values preferably correspond to consumption values associated with the respective predetermined discreet periods of time, such as ten seconds. The sets of consumption values preferably are stacked such that, at desired time intervals, the oldest one of the sets of values is deleted and the latest set is placed in the stack as a replacement. Preferably about 3 to about 10 sets are in the stack at any given time, most preferably about 6 sets. Computer unit 90 totals the stacked sets of values and averages the values, thereby calculating a pseudo real-time consumption value, moderated according to the number of sets of consumption sample values in the stack, and the time over which each set was accumulated.

Current consumption rate is thus obtained by computing a pseudo real time consumption value using a number of sets of consumption data, each collected over a short period of time. Since the collection periods for any one set is short, the consumption rate is up-dated at respective short periods. The stack of such sets is used in order to screen out short term fluctuations in consumption value, as well as to screen out short term fluctuations in the rate at which a meter may send metering data even when the consumption rate remains constant.

Step 134 then publishes the calculated pseudo real-time consumption value on network 184 and deletes the oldest set from the stack to prepare for the next sampling of data. Publishing comprises sending the data out on the network, or otherwise making the data available to the network, to be read by other nodes or other devices receptive to the information and authorized to receive the information.

Step 136 then calculates a projected/predicted end-of-interval consumption value for the respective meter based on the consumption that has occurred so far during the interval, and the assumption that the rate of consumption will stay at the current calculated pseudo real-time rate for the remainder of the interval.

Step 138 then publishes the projected/predicted end-of-interval consumption value on network 184 for use by other nodes. From step 138 the system returns to a decision tree comprising step 140. The publishing of step 134, of course, can be combined with the publication of step 138. Thus, the calculated pseudo real-time value and the projected/predicted end-of-interval value can be published over network 184 at substantially the same time.

At step 140, computer unit 90 asks whether there are any pulses on channels defined as end-of-interval inputs. End-of-interval signals may be generated by the respective consumption meters being monitored by recording node 8. In such case, the respective meter is connected to two of input channels #1–#4 (FIG. 1BA). A first channel receives and processes consumption data from the meter, while a second channel receives and processes end-of-interval data from the same meter. Thus, in such scenario, each meter utilizes two of inputs #1–#4 and two of channels BA1–BA4, for example channel BA1 for pulses indicating quantity or volume and BA2 for signals indicating completion of a predetermined time interval. If an end-of-interval signal is received the system advances to path 142 which will be described hereinafter. Time intervals will also be described hereinafter.

Step 140 comprises an optional step that is only utilized in embodiments having meters with a separate end of interval signal on a separate line. In other examples, step 140 can be removed from the flow chart and steps 130–138 can connect directly to step 144.

After returning from path 142 or, in the case of a NO condition, advancing from step 140, the system then reaches step 144.

Step 144 comprises a decision tree asking whether a time interval has ended on any of the channels. Ending a time interval means that the time associated with the respective interval has expired. If YES, the system advances along path 142. If NO, the system advances to step 146.

After decision tree 140 or decision tree 144, path 142 returns to the appropriate location in the flow chart of FIG. 2A depending on the point of entry of path 142.

Step 146 checks to see if any data, such as price data, has become current, will become current within a time period of interest, or has otherwise changed. For example, if the price of electricity during the next hour is different from the present price, and time elapses into the new (e.g. hour) interval, the new price becomes the current price, and is published or is otherwise made available on network 184 for use by other nodes. Such price data may be considered actual real-time price data because the price stored is the actual price being charged, or to be charged, for the interval in question.

Step 148 then publishes the current date and time on network 184 for use by other nodes or devices. The date and time are generated by clock/calendar device 76 and computer unit 90. Return step 150 then returns the system to step 112 in FIG. 2.

Figure 2B:
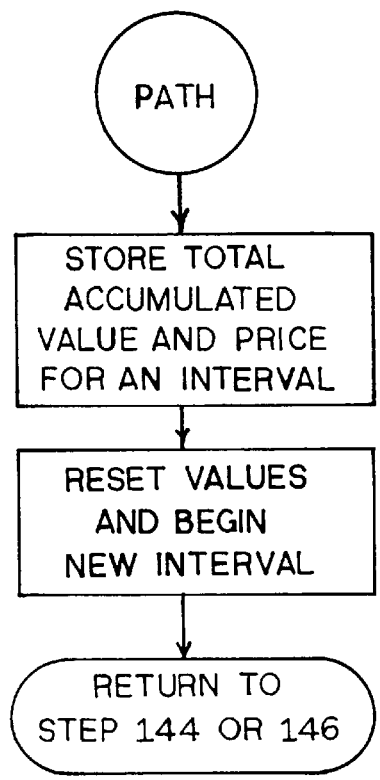
FIG. 2B shows a flow chart of path 142 of FIG. 2A.

Path 142, referred to in FIG. 2A, and illustrated in FIG. 2B, will be explained next. The system recognizes the end of a time interval when the system detects either an end-of-interval pulse in step 140, or completion in step 144 of the clock time associated with the interval, whereupon path 142 is chosen. Referring to FIG. 2B, path 142 leads to step 152.

Step 152 stores the combination of the accumulated consumption value for the interval, according to the signals sent by the respective meters, and the product price in effect during the interval, to one or more of non-volatile memory devices 102A–102H. This combined data is stored for remote reading by other nodes or computer unit 90 in the future. Step 152 is followed by step 154.

Step 154 begins a new interval for the channel whose signals have been stored. "Signals" as used here includes consumption data and associated price. Accumulated consumption value is reset to zero, and the product price in effect for the new interval is updated. Step 156 then advances path 142 to step 144 or step 146 as appropriate.

Figure 2C:
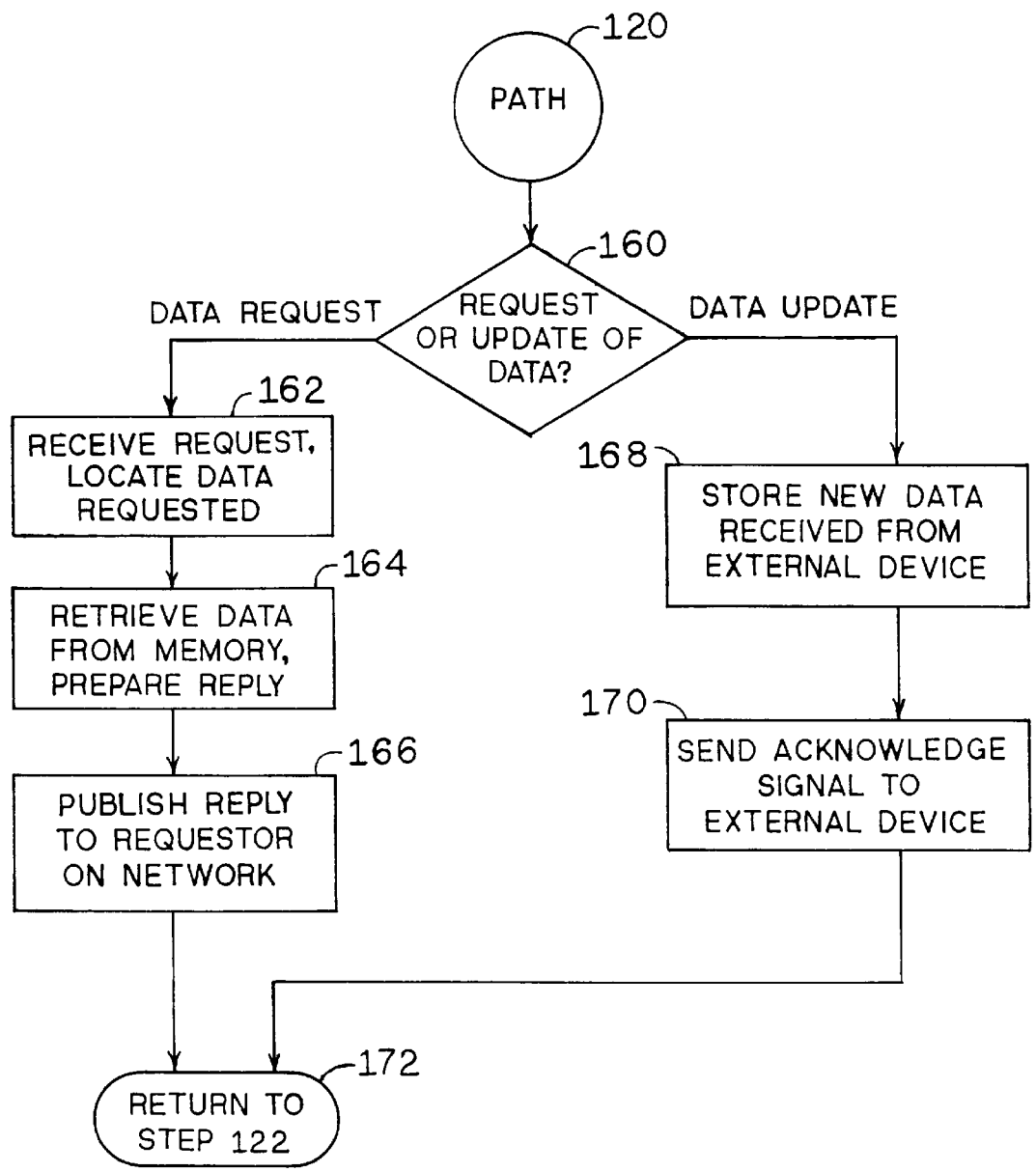
FIG. 2C shows a flow chart of path 120 of FIG. 2.

FIG. 2C corresponding to path 120 (referred to in FIG. 2) will now be explained. Path 120 is selected by decision tree step 116 when a data request or data update has been received such as via network 184.

Step 160 comprises a decision tree asking whether the request is a data request or an update request. If the request is a data request, step 160 advances the system to step 162. Step 162 reads the request. Based on the data item requested, step 162 determines the non-volatile memory location where the data is stored.

Step 164 then retrieves the data from one or more of memory devices 102A–102H and prepares a reply that includes e.g. the date and time of the request for the data, the retrieved actual data (e.g. consumption value), and any associated (e.g. pricing) information. Step 166 then publishes the reply to network 184 with appropriate access authorizations. The data can then be retrieved from the network by the requestor. If desired, the data transmission can be addressed directly to the requestor. Step 172 then returns path 120 to step 122 in FIG. 2.

If the request is an update request, decision tree step 160 advances the system to step 168. Step 168 stores the forecast value, or data related to price or other parameter, to the appropriate memory location. The value, and time at which the value becomes effective, are stored, preferably in one or more of non-volatile memory devices 102A–102H or in flash memory of computer unit 90 until a successive forecast value or other data up-date is received and replaces the previous value. Step 168 can include reading and storing quotes, pricing, or other data from a utility, as well as weather or nominated quantity product data.

Following step 168, step 170 then sends an acknowledgement signal indicating a successful update, over network 184, the acknowledgement thus being accessible to the device that sent the data. Step 170 then advances to step 172 which returns path 120 to step 122 in FIG. 2.

Applications

FIG. 3 shows a network process control system 175, including energy management elements, such as recording node 8 receiving separate inputs from electric meter 176 connected to electrical line 178 and from gas meter 180 connected to gas line 182. Recording node 8 is connected to distributed network 184.

Network process control system 175 includes controller node 186, monitor node 188, display node 190, alarm node 192, and communication node 194. Controller node 186 and monitor node 188 interact with an operating process 196. Controller node 186 can control energy usage in process 196, and monitor node 188 can display energy usage or other information from the process.

An existing process computer 200 for operating process 196, having a gateway 202 to distributed network 184 can read or send data over the network to various nodes. A personal computer 204 having a gateway 206 can read data from, or send data to, selected nodes over network 184. A utility can send information, such as price data for future time intervals, to communication node 194 via radio frequency signals, twisted pair wires, telephone lines, fiber optic cables, power line carrier, or any other known transmission system.

In operation, recording node 8 senses pulses from electric meter 176 related to the amount of electrical energy being consumed by operating process 196. Using the recording node as described earlier, the pulses are counted and summed to calculate (i) an accumulated electrical consumption value (e.g. megawatts, kilowatts or watts), (ii) a current pseudo real-time electrical consumption rate value, and (iii) a predicted total electrical consumption value for the time interval of interest.

For major consumers of electricity, the electricity provider typically bases its charges on a combination of (a) the amount of electricity actually consumed for the billing period and (b) the peak consumption rate for any one 15 minute time interval during the billing period. Thus, for electric meters, the time interval of interest preferably comprises 15 minutes. However, in some cases the time interval may be different. Thus intervals can be 5 minutes, 30 minutes, 60 minutes, 24 hours in length or any other time interval selected by the user. Typically, such interval is no more than 48 hours for any utility.

The consumption values listed above can be up-dated at any time and at any frequency, but preferably are up-dated every second or every few seconds. Generally, the more frequent the updating calculations, the greater the precision of the results so calculated.

Some electric meters 176 have a second wire that sends a pulse signal when the end of a time interval has occurred. In such event, a second channel of meter signal processing circuit 40 is used to detect an end-of-interval signal rather than another meter input signal. Computer unit 90 is programmed, controlled and operated to detect the end-of-interval signal and control recording node 8 accordingly.

At the end of an interval, the accumulated value for consumption of electricity during that interval, the price of electricity for that interval, and the exact date and time of the interval are stored in one or more of memory devices 102A–102H. This data is available for reading by any authorized nodes on network 184, or by other authorized external devices.

At the end of an interval, the consumption values are reset. Sensing of electrical consumption, checking the price of electricity for the next interval, and calculating and accumulating current electrical consumption rates are begun as part of the next interval.

Again referring to FIG. 3, recording node 8 senses signals from gas meter 180 related to the amount of gas being consumed by operating process 196. Using the meter signal processing circuit 40 and computer unit 90 described earlier, the signals are counted and summed to calculate (i) an accumulated gas consumption value (e.g. therms), (ii) a current pseudo real-time gas consumption rate value, and (iii) a predicted gas consumption value for the time interval of interest.

Gas providers typically base charges on a combination of (a) the amount of gas actually consumed for the billing period and (b) any deviation from nomination for any noon-to-noon 24 hour interval during the billing period. Thus for gas meters, the time interval of interest typically comprises, for example, 24 hours from noon to noon. At any rate, the intervals can be selected to have a length of time suitable and practical for both the customer receiving the gas and the utility providing the gas.

As suggested earlier, at the end of a time interval, the accumulated value for the consumption of gas during that interval, the price of gas for that interval, and the exact date and time of the interval are stored in one or more of non-volatile memory devices 102A–102H. This data is available for reading by any authorized nodes on network 184, or by other authorized external devices. The gas consumption values are then reset. Sensing of gas consumption, checking the price of gas for the next interval, and calculating and accumulating current gas consumption values and rates are begun as part of the next interval.

In preferred embodiments, the consumption values are stored concurrently with price data, such that specific price data in storage in memory devices 102A–102H can be associated with any consumption value stored in memory devices 102A–102H. From such association of price and consumption values, recording node 8 can calculate the total accrued cost for a time interval of interest, such as a billing period or any elapsed portion of a billing period. The combination of such historic consumption data and price data, along with projected future price data which can also be made available e.g. over network 184, a projected bill for the billing period can also be calculated by recording node.

Accordingly, with respect to any substance flowing through a meter, whether gas, electricity, or otherwise, recording node 8 can for example calculate, and display on a suitable display device, any or all of (i) the accumulated consumption amount for a period of interest, (ii) a projected consumption amount for the period of interest, (iii) a pseudo real-time consumption rate, (iv) a total accrued cost for the period, and (v) a projected cost to the end of the period. Display of cost-type information, of course, assumes that respective price information is available to recording node 8 such as stored in one or more of memory devices 102A–102H.

Calculation of gas consumption values, and gas consumption rates can occur at any time frequency, but preferably occur every second or every few seconds. As with electricity consumption values, gas consumption values are predicted with greater accuracy as shorter time intervals are used.

The predicted electrical consumption values and the predicted gas consumption values, as well as current rate values, can be sent to controller node 186, to display node 190, and/or alarm node 192 of network process control system 175, or to any other node desired. Display node 190 can display the current pseudo real-time consumption value or the predicted consumption value for a particular interval of interest. Control node 186 can take steps to increase or decrease electrical or gas, or other utility consumption by operating process 196 as needed to control cost, and to avoid penalties for excess consumption rate for a selected interval, in view of the electrical consumption value predicted by recording node 8.

Monitor node 188 can track e.g. process energy efficiencies within operating process 196 and transmit those values to other nodes upon request.

Display node 190 can read the consumption values from recording node 8 and display the values to plant operators who can manually control operating process 196 as needed. Alarm node 192 can alert plant operators to undesirable energy consumption conditions.

In a distributed network as illustrated in FIG. 3, all of the nodes mentioned can receive or display information from other nodes as needed and requested, not just from recording node 8. Recording node 8 can receive information, such as price data, from service provider 210 via communications node 194 and network 184. Recording node 8 can store selected information which can be retrieved by other nodes through network 184.

Weather forecast data, and data as to planned future use of energy, for example, in operating process 196, can also be sent back and forth across network 184 on an ongoing basis, and received and stored in recording node 8 for use by other nodes.

Receiving information on an "ongoing basis" means that the information is up-dated at intervals shorter than the typical monthly billing period. For example, weather data might be updated daily or hourly. Pricing information might be updated any time a price change is implemented or projected. For example electricity pricing might change hourly, and respectively communicated immediately or as needed through communication node 194 to the recording node at the customer's premise.

Furthermore, service provider 210 can receive previously accumulated consumption values and associated prices for past consumption intervals, for billing purposes over network 184.

Existing process computer 200 for operating process 196 can receive or send data via a gateway 202 onto network 184. Thus the existing process computer can be apprised of changes in the price of energy, weather forecasts and other information needed in deciding how to operate the operating process. Further in an optional embodiment, a user of personal computer 204 can enter network 184 via gateway 206 to receive data of interest from any of the nodes, such as from recording node 8.

It will be appreciated by those skilled in the art that source meters from which recording node 8 receives its data inputs provide signals having limited amplitude, and that such signals may be attenuated over rather short distances between the meter and the recording node. Accordingly, where the meter is so remote from the recording node that the meter signal may be so attenuated, a meter signal processing circuit having the characteristics of circuit 40 (thus, a remote circuit 40) may be incorporated into the meter or attached to the meter, or a like circuit may be mounted sufficiently close to the meter as to successfully receive and process the meter output.

Such remote circuit 40, whether built into the meter or provided in a housing separate from the meter, operates as a subrecorder node on the network. The subrecorder node receives signals from the meter, counts pulses associated with such signals, and publishes output signals over network 184. In the alternative, the subrecorder node can publish output signals over another electronic medium not directly connected to network, but to which recording node 8 is connected. The subrecorder generally does no calculation, and has limited memory as compared to recording node 8.

Main recording node 8 receives the signals from the subrecorder and treats such signals as coming from counting circuit 60.

Similarly, recording node 8 can receive and process signals from a combination of local and remote meters. Where recording node 8 receives all meter consumption data from subrecorders, or remote circuits thereof, associated with remote meters, the function of meter processing circuit 40 is performed by the signal processing circuits in the subrecorders, whereby circuit 40 is redundant in main recording node 8. In such event, circuit 40 may be omitted from recording node 8, and recording node 8 may thus be devoid of such signal processing circuitry.

Recording node 8 can, of course, receive outputs from local meters which have subrecording circuitry incorporated therein, or from subrecorders associated with local meters.

Thus, main recording node 8 and the one or more subrecorders associated with meters can operate in combination as a "recording system." Counting circuit 40, of course, converts the pulse inputs from meters into quantitative form, for use by computer unit 90. Where meter output is other than a pulse-type output, for example a quantitative output, the quantitative output is fed through an appropriate counting or other conditioning circuit as needed to prepare the signal for receipt by computer unit 90. Computer unit receives the output from the counting or conditioning circuit, and integrates such output over time.

Where meter output to a subrecorder is a pulse output, the signal is passed through an appropriate isolation circuit, then software debounced and software counted; and a quantitative signal is preferably placed on network 184. The quantitative signal is read by recording node 8 and passed directly to computer unit 90 through twisted pair terminals on network connector 92.

Operating process 196 can comprise, for example, a paper making process, an automobile manufacturing process, a steel making process, or a building control or management process. Generally, process 196 can be any process utilizing amounts of energy of such substance as to merit use of the other elements of control system 175.

Operating process 196 can be a manufacturing process, a climate control process, an environmental management system, or any other controllable process. An exemplary energy control system for a building is described in U.S. Pat. No. 5,289,362 to Liebl et al which is herein incorporated by reference in its entirety. Such energy management systems monitor temperature, humidity and the like.

While electricity meter 176 and gas meter 180 are shown in FIG. 3, other types of product meters can also be connected to the recording node, can be monitored, and their outputs can be received, manipulated, and accumulated by recording node 8. Such product meters include, for example, and without limitation, temperature meters, pressure meters, water usage meters, water level meters, and steam usage meters.

While recording node 8 has been described in terms of receiving and processing information related to energy-type utilities, such recording node can also receive inputs from a wide variety of other types of meters such as liquid flow meters, powder flow meters, and the like. All such meters measure flow of some substance, whether visible and tangible like liquids, or invisible and/or somewhat intangible like gas and electricity.

Recording node 8 can utilize pulses or other signals from any such meters to calculate parameter values for use by other nodes as well as by recording node 8. Where pulses are received, the pulses are used directly to do the above described calculations. Where signals other than pulses are received, a preferred recording node 8 first converts such signals into pulses and then uses the pulses to do the calculations, or takes the signal into a transducer which is connected to network 184 transmits the signal on network 184 to recording node 8 which in turn stores the signal.

Another application for use with an environmental management system or an energy management system includes detecting the loss of power signal generated on line A1 by power supply circuit 10. This signal reaches computer unit 90 via interface circuit 70. Computer unit 90 can be programmed to calculate and store in one or more of digital memory devices 102A–102H, or to publish on network 184, values for the time of loss of power and values for the duration of the loss of power condition. In the alternative, computer unit 90 can merely indicate, to the network, a loss of power.

Network process control system 175 preferably comprises multiple intelligent nodes such as nodes 8, 186, 188, 190, 192 that communicate with each other. Individual nodes preferably make decisions using data received from other nodes and from other external data sources. Thus, system 175 preferably does not have a central processor.

Network

Process control network 184 can comprise a local operating network ("LON") which allows data transfer among a large number of nodes, such as recording node 8. LON's are made up of intelligent communication devices, such as recording node 8, that are combined for communication with one another across a communication medium utilizing a communication protocol. One preferred protocol being developed by Echelon Corporation is referred to as LONTALK®. In particular, LONTALK® is a framework for all of the communications occurring on the network. Hardware and software tools, suitable for developing a LON using both LONTALK® and LONWORKS®, is sold by Echelon. A discussion of using LONWORKS® in the utility industry is set forth in a publication, available from Echelon Corporation, and titled "A Control Networking Solution for the Utility Industry" dated May 11, 1995, herein incorporated by reference. More information on the Echelon network and NEURON® computer chip can be found in U.S.

Pat. No. 4,918,690; U.S. Pat. No. 4,941,143; U.S. Pat. No. 4,955,018; U.S. Pat. No. 4,969,147; and U.S. Pat. No. 5,319,641, all of which are herein incorporated by reference.

Recording node 8 can also be integrated into, and used with, other network systems such as those designed by Control Systems International (CSI) of Carrollton, Tex. The CSI network system utilizes a twisted shielded pair of wires, RS-485 Protocol, and operates at a 9600 baud rate.

Recording node 8 can also be integrated into, or used with a process control network comprising a power line. Such a network is disclosed in U.S. Pat. No. 5,289,362 to Liebl et al. Liebl et al disclose using X-10 modules available from retailers Radio Shack or Sears Roebuck and Company, to communicate over the power line.

While process control network 184 preferably comprises twisted wires or power line communication, recording node 8 can be utilized with any type of network. For example, the network can be formed by telephone lines, fiber optic cables, radio frequency links or other connections or combinations of connections. Whatever process control network 184 is selected, the network 184 must be designed to allow for the fast delivery of small quantities of data because frequent up-dating is required for real-time control of operating process 196.

Comparison of Predicted Value Vs. Real Time Value

Figure 4:
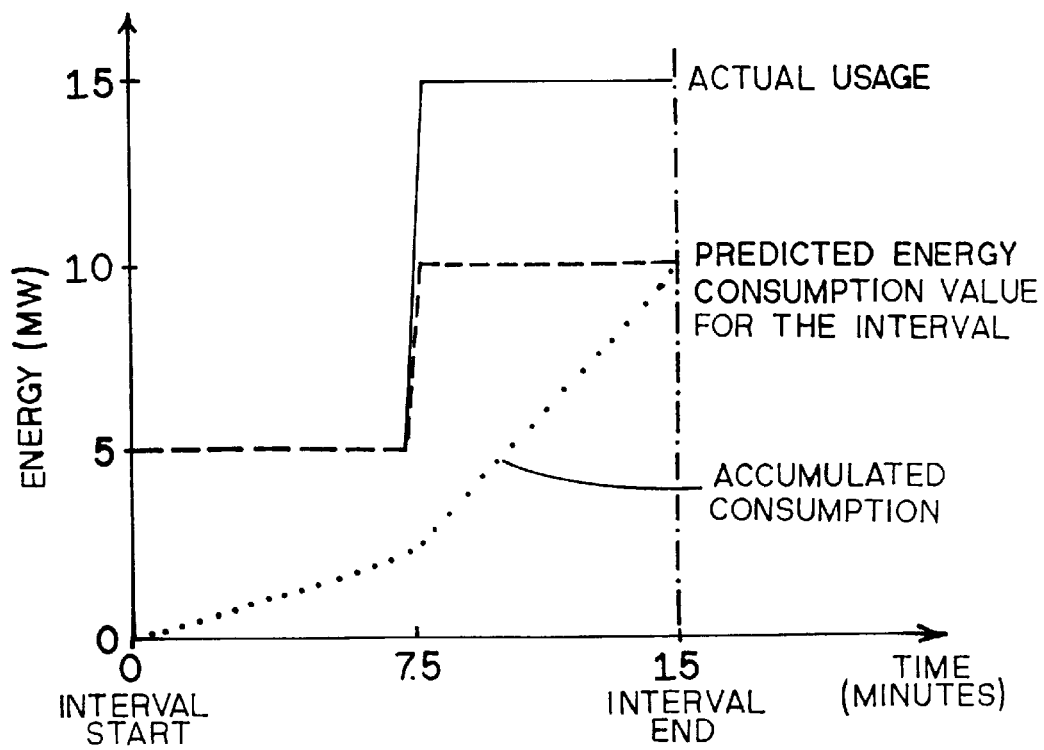
FIG. 4 is a graph showing the present rate of energy usage vs. time and predicted total usage for a time interval.

FIG. 4 shows one energy usage example where the predicted electrical consumption value of recording node 8 functions better than real-time control of electricity usage.

As suggested above, large users of electricity (and gas) may contract with the energy provider for blocks of predetermined amounts of energy to be used during predetermined time intervals. If such a customer uses more energy than was contracted or planned for, that customer typically pays a penalty for exceeding the allowed peak usage rate. Price data for such large quantities of energy for a specific interval of time are defined herein as "quotes." If the customer uses less energy than was contracted or planned for (quoted), the customer may have to pay for energy which was never actually used. If the customer uses more energy than quoted, the customer may have to pay a peak usage rate penalty. Therefore, there is a financial incentive for the customer to correctly judge and control the amount of energy that will be used and to use the precise amount of energy contracted for, no more and no less.

In the example illustrated in the graph of FIG. 4, the customer purchased 10 megawatts of electricity, to be used during a particular 15 minute time interval. During the first half of the interval, 5 megawatts of energy were drawn from the utility. During the second half of the interval, 15 megawatts were drawn from the utility. The actual real time rate of use of electricity is shown by the solid line. As disclosed earlier, the predicted electrical consumption value for the time interval is shown by the dashed line, and is 5 megawatts, the same as the actual amount used, for the first half of the interval. The predicted value for the entire second half of the interval, when the real-time rate of consumption is 15 megawatts, is 10 megawatts and is calculated by recording node 8 as 10 megawatts, even though 15 megawatts of power is being drawn. The reason for this result is that, even though 15 megawatts is being drawn, the predicted electrical consumption is based on the accumulated value for the portion of the interval elapsed, plus the current electrical consumption rate times the remaining portion of the interval. Thus, operating during the second half of the interval at 15 megawatts does not lead to a false indication of overuse of electrical energy.

However, a real-time energy control system operating with the same data sees the increase to 15 megawatts as being outside of the purchased value of 10 megawatts. Thus a real-time system would provide a false alarm indication to the customer, or would attempt to control the load to 10 megawatts because the real-time system does not utilize the entire interval, but instead relies only on the current, actual real-time consumption rate at any given instant.

As used herein, "process control network" means a network for controlling a manufacturing process, other product conversion process, a building control process, or the like.

As used herein, a "distributed network" means a network having no central computer controlling all flow of information through the network.

As suggested above, recording node 8 can simultaneously receive and manipulate data from a plurality of electric meters, for example a group of meters dispersed throughout a single premise of a manufacturing operation. Meter node 8 can receive, calculate, store, and make available, separately, information derived from each meter. In addition, recording node 8 can combine the data from all such electric meters and store and make available the resultant combination data.

Similarly, recording node 8 can simultaneously receive, manipulate, store, and make available over the network, information from a plurality of gas meters and/or other metering devices.

As referred to in the claims that follow "a set" of product meters can be as few as one meter.

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

To the extent the following claims use means plus function language, it is not meant to include there, or in the instant specification, anything not structurally equivalent to what is shown in the embodiments disclosed in the specification.

Having thus described the invention, what is claimed is:

1. A recording node, comprising:
   (a) a receiving device receiving metering data from a product meter over discreet periods of time;
   (b) a storage device storing the metering data; and
   (c) a calculating device calculating a pseudo real-time consumption rate value corresponding to an average of the values represented by the data corresponding to sets of the most recent discreet periods available.

2. A recording node as in claim 1, said recording node receiving metering data from at least first and second product meters indicating consumption of a single type of utility, and calculating the pseudo real-time consumption rate based on the metering data received from the combination of the at least first and second product meters.

3. A recording node as in claim 1, said recording node receiving metering data from first and second sets of product meters, each set reading a different type of utility, and calculating separate values for each such set of meters.

4. A recording node as in claim 1, the metering data being received by said recording node over a process control network.

5. A recording node as in claim 1, said recording node including at least one optical isolator.

6. A recording node as in claim 1, the metering data being associated with consumption of electricity.

7. A recording node as in claim 1, the metering data being associated with consumption of gas.

8. A recording node as in claim 1, wherein the discreet periods of time are predetermined discreet periods of time.

9. A recording node as in claim 1, wherein the discreet periods of time are from about 5 to about 30 seconds.

10. A recording node as in claim 1, wherein the discreet periods of time are about 10 seconds.

11. A recording node as in claim 1, wherein the calculating device calculates once every discreet period of time.

12. A recording node as in claim 1, wherein the sets of the most recent discreet periods available comprise about 3 to about 10 sets.

13. A recording node as in claim 1, said recording node further comprising a deletion device for deleting an oldest set from sets of the most recent discreet periods available after calculation of the pseudo real-time consumption rate value.

14. A recording node, comprising:
  (a) a receiving device receiving sets of metering data from a product meter over discreet periods;
  (b) a storage device storing the metering data; and
  (c) a calculating device calculating a projected consumption value for an interval shorter than a billing period, based on (i) the amount of the utility used during the completed portion of the interval and (ii) the current rate of consumption of the utility.

15. A recording node as in claim 14, including calculating the current rate of consumption of the utility based on data corresponding to a stack of the most recent sets of metering data available.

16. A recording node as in claim 14, said recording node receiving metering data from at lest first and second product meters indicating consumption of a single type of utility, and calculating the predicted consumption value based on the metering data received from the combination of the at least first and second product meters.

17. A recording node as in claim 16, said recording node further calculating a pseudo real-time consumption rate value based on the metering data received from the combination of the at least first and second product meters.

18. A recording node as in claim 14, said recording node receiving metering data from first and second groups of product meters, each reading a different type of utility, and calculating separate values for each such group of meters.

19. A recording node as in claim 14, the metering data being received by said recording node over a process control network.

20. A recording node as in claim 14, said recording node including at least one optical isolator isolating said receiving device from the respective product meter.

21. A recording node as in claim 14, said recording node storing accumulated consumption values at the end of the time interval as an actual accumulated value for the interval in a non-volatile memory device, said recording node then resetting said calculation device, restarting and recalculating consumption values for a next time interval in response to receiving such end-of-interval signal.

22. A recording node as in claim 14, the metering data being associated with consumption of gas.

23. A recording node as in claim 14, the metering data being associated with consumption of electricity.

24. A method of generating a pseudo real-time consumption rate value for a management system, the method comprising the steps of:
  (a) periodically receiving metering data from a meter; and
  (b) calculating a pseudo real-time consumption rate value for the system by
    (i) accumulating sets of values received from the meter for a predetermined time period,
    (ii) summing the values so accumulated for a number of the time periods, and
    (iii) averaging the accumulated values to thereby generate a calculated pseudo real-time consumption rate value for the management system.

25. A method as in claim 24, including repeating the steps of:
  (iv) accumulating a further set of values from the meter for a further predetermined time period,
  (v) subtracting the oldest set of values and adding the further accumulated set of values to the accumulated values for the meter, and
  (vi) repeating step (b)(iii).

26. A method as in claim 24, including the steps of calculating an accumulated consumption value and storing the accumulated consumption value at the end of an interval and repeating the step of calculating an accumulated consumption rate value after resetting the accumulated consumption value.

27. A method as in claim 24, the predetermined number of time periods comprising from about 3 time periods to about 10 time periods.

28. A method as in claim 24, the length of each of the predetermined time periods comprising between about 5 seconds and about 30 seconds.

29. A method as in claim 24, including receiving, storing and updating weather data, on an ongoing basis, at the recording node, at intervals shorter than the billing period.

30. A method as in claim 29, including receiving, storing, and updating pricing information, on an ongoing basis, at the recording node, at intervals shorter than the billing period.

31. A method as in claim 24, including reading metering data from at least first and second meters, the meters in combination indicating consumption of a single type of energy resource, and calculating pseudo real-time consumption rate values for the combination of all such meters.

* * * * *

UNITED STATES PATENT AND TRADEMARK OFFICE
CERTIFICATE OF CORRECTION

PATENT NO. : 5,974,369
DATED : October 26, 1999
INVENTOR(S) : Mark A. Radtke et al.

It is certified that error appears in the above-identified patent and that said Letters Patent is hereby corrected as shown below:

Claim 16, line 2, change "lest" to --least--.

Signed and Sealed this

Nineteenth Day of September, 2000

Attest:

Q. TODD DICKINSON

*Attesting Officer*     *Director of Patents and Trademarks*